(12) United States Patent
Terashita (10) Patent No.: US 9,203,935 B2
(45) Date of Patent: Dec. 1, 2015

(54) COMMUNICATION APPARATUS, COMMUNICATION SYSTEMS, METHODS, AND NON-TRANSITORY COMPUTER-READABLE MEDIA FOR PROCESSING DATA ACCORDING TO DIFFERENT PROTOCOLS IN RESPONSE TO PACKETS RECEIVED USING DIFFERENT INTERFACE STANDARDS

(71) Applicant: Kunihito Terashita, Nagoya (JP)

(72) Inventor: Kunihito Terashita, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 362 days.

(21) Appl. No.: 13/764,043

(22) Filed: Feb. 11, 2013

(65) Prior Publication Data

US 2013/0259025 A1    Oct. 3, 2013

(30) Foreign Application Priority Data

Mar. 28, 2012  (JP) ................................ 2012-074327

(51) Int. Cl.
*H04W 4/00* (2009.01)
*H04L 29/06* (2006.01)
*G06F 3/12* (2006.01)

(52) U.S. Cl.
CPC .............. *H04L 69/18* (2013.01); *G06F 3/1209* (2013.01); *G06F 3/1236* (2013.01); *G06F 3/1248* (2013.01); *G06F 3/1285* (2013.01); *G06F 3/1292* (2013.01); *G06F 3/121* (2013.01); *G06F 3/1268* (2013.01)

(58) Field of Classification Search
None
See application file for complete search history.

(56) References Cited

U.S. PATENT DOCUMENTS

| | | | |
|---|---|---|---|
| 2002/0032786 A1 | 3/2002 | Yamada et al. | |
| 2004/0229606 A1* | 11/2004 | Oshima et al. | 455/426.2 |
| 2006/0111042 A1* | 5/2006 | Pitchers | 455/20 |
| 2007/0208863 A1* | 9/2007 | Otsuka et al. | 709/227 |
| 2008/0294776 A1* | 11/2008 | Ding | 709/226 |
| 2011/0060833 A1 | 3/2011 | Nogawa | |

(Continued)

FOREIGN PATENT DOCUMENTS

| | | |
|---|---|---|
| JP | 2002-055729 A | 2/2002 |
| JP | 2011-054135 A | 3/2011 |

OTHER PUBLICATIONS

Wi-Fi Alliance, "Wi-Fi Alliance Technical Committee P2P Task Group: Wi-Fi Peer-to-Peer (P2P) Technical Specification," Version 1.1, 2010.

*Primary Examiner* — Bob Phunkulh
(74) *Attorney, Agent, or Firm* — Baker Botts L.L.P.

(57) ABSTRACT

A communication apparatus includes a communication interface, a processor, and a memory. The communication interface uses a first interface standard and a second interface standard. The memory stores computer-readable instructions therein. The processor executes the computer-readable instructions, which instruct the communication apparatus to perform various processes in accordance therewith. The computer-readable instructions instruct the communication apparatus to transmit a response packet to an external device in response to receiving a request packet from the external device when a condition is satisfied. The response packet complies with a specific protocol. The condition is satisfied when the request packet is received using the first interface standard and complies with the specific protocol. The condition is not satisfied when the request packet is received using the second interface standard and complies with the specific protocol.

17 Claims, 5 Drawing Sheets

(56) References Cited

U.S. PATENT DOCUMENTS

2011/0225292 A1* 9/2011 Lee .............................. 709/224
2012/0198259 A1* 8/2012 Suzuki ......................... 713/323
2012/0224206 A1* 9/2012 Takahashi et al. ........... 358/1.13

* cited by examiner

| FUNCTIONS | PROTOCOLS | EXECUTION OF FUNCTION | | RESPONSE | | MANAGEMENT INFORMATION | |
|---|---|---|---|---|---|---|---|
| | | WIRED | WIRELESS | WIRED | WIRELESS | WIRED | WIRELESS |
| PORT 9100 PRINT | P1 | OK | OK | OK | OK | YES | YES |
| NETBIOS PRINT | P2 | OK | NG | OK | NG | YES | NO |
| NETWORK SCAN | P3 | OK | OK | OK | OK | YES | YES |
| WEB SERVER | P4 | OK | NG | OK | OK | YES | YES |
| I FAX | P5 | OK | NG | OK | NG | YES | NO |

Fig.4

COMMUNICATION APPARATUS, COMMUNICATION SYSTEMS, METHODS, AND NON-TRANSITORY COMPUTER-READABLE MEDIA FOR PROCESSING DATA ACCORDING TO DIFFERENT PROTOCOLS IN RESPONSE TO PACKETS RECEIVED USING DIFFERENT INTERFACE STANDARDS

CROSS-REFERENCE TO RELATED APPLICATION

This application claims priority to Japanese Patent Application No. 2012-074327, filed on Mar. 28, 2012, the disclosure of which is incorporated herein by reference.

BACKGROUND OF THE INVENTION

1. Field of the Invention

The invention disclosed herein relates generally to data transmission and processing and more specifically to communication apparatus, communication systems, methods, and non-transitory computer-readable media for processing data according to different protocols in response to packets received using different interface standards.

2. Description of Related Art

A known information apparatus transfers reproduced data. The known information apparatus transfers reproduced data in a wide hand when wired communication is taking place. The known information apparatus reduces the amount of reproduced data to be transferred and subsequently transfers reproduced data in a narrow band when wireless communication is taking place. The information apparatus transfers reproduced data to a requester in response to a request for activation of a transfer software program through one or more of wired communication and wireless communication.

SUMMARY OF THE INVENTION

Aspects of the present disclosure may provide a technique that may permit a communication apparatus to adequately operate when the communication apparatus receives a first packet complying with a specific protocol via a first interface and when the communication receives a second packet complying with the specific protocol via a second interface.

A communication apparatus disclosed herein may include a communication interface, a processor, and a memory. The communication interface may communicate using a first interface standard and a second interface standard. The memory may be configured to store computer-readable instructions therein. The processor may execute the computer-readable instructions, which may instruct the communication apparatus to perform various processes in accordance therewith. In particular, the computer-readable instructions may instruct the communication apparatus to transmit a first response packet to an external device in response to receiving a first request packet from the external device when a first condition is satisfied. The first response packet may comply with a specific protocol. In addition, the first condition may be satisfied when the first request packet is received using the first interface standard and complies with the specific protocol. Nevertheless, the first condition may not be satisfied when the first request packet is received using the second interface standard and complies with the specific protocol.

With the above configuration, the communication apparatus may transmit a first response packet to the external device in response to receiving the first request packet that complies with the specific protocol using the first interface standard and may not transmit the first response packet to the external device in response to receiving the first request packet that complies with the specific protocol using the second interface standard. That is, the communication apparatus may determine whether or not to transmit the first response packet depending on the communication interface and processing protocol. Therefore, the communication apparatus may adequately operate when receiving a request packet.

A control method, computer-executable instructions, and a non-transitory computer-readable recording medium storing the computer-executable instructions, each of which may realize the above-disclosed functions of the communication apparatus also are disclosed herein.

For example, a computer-readable medium disclosed herein may store computer-readable instructions therein. The communication apparatus may communicate using a first interface standard and a second interface standard. When executed by the processor of a communication apparatus, the computer-readable instructions may instruct the communication apparatus to perform various processes in accordance therewith. In particular, the computer-readable instructions may instruct the communication apparatus to transmit a response packet to an external device in response to receiving a request packet from the external device when a condition is satisfied. The first response packet may comply with a specific protocol. In addition, the condition may be satisfied when the request packet is received using the first interface standard and complies with the specific protocol. Nevertheless, the condition may not be satisfied when the request packet is received using the second interface standard and complies with the specific protocol.

Further, a communication system disclosed herein may include a terminal device and a communication apparatus. The communication apparatus may include a communication interface, a processor, and a memory. The communication interface may communicate using a first interface standard and a second interface standard. The memory may be configured to store computer-readable instructions therein. The processor may execute the computer-readable instructions, which may instruct the communication apparatus to perform various processes in accordance therewith. In particular, the computer-readable instructions may instruct the communication apparatus to transmit a response packet to the terminal device in response to receiving a request packet from the terminal device when a condition is satisfied. The first response packet may comply with a specific protocol. In addition, the condition may be satisfied when the request packet is received using the first interface standard and complies with the specific protocol. Nevertheless, the condition may not be satisfied when the request packet is received using the second interface standard and complies with the specific protocol.

Other objects, features, and advantages will be apparent to persons of ordinary skill in the art from the following detailed description of the disclosure and the accompanying drawings.

BRIEF DESCRIPTION OF THE DRAWINGS

For a more complete understanding of the present disclosure, needs satisfied thereby, and the objects, features, and advantages thereof, reference now is made to the following descriptions taken in connection with the accompanying drawings.

DETAILED DESCRIPTION OF EMBODIMENTS OF THE INVENTION

Figure 1:
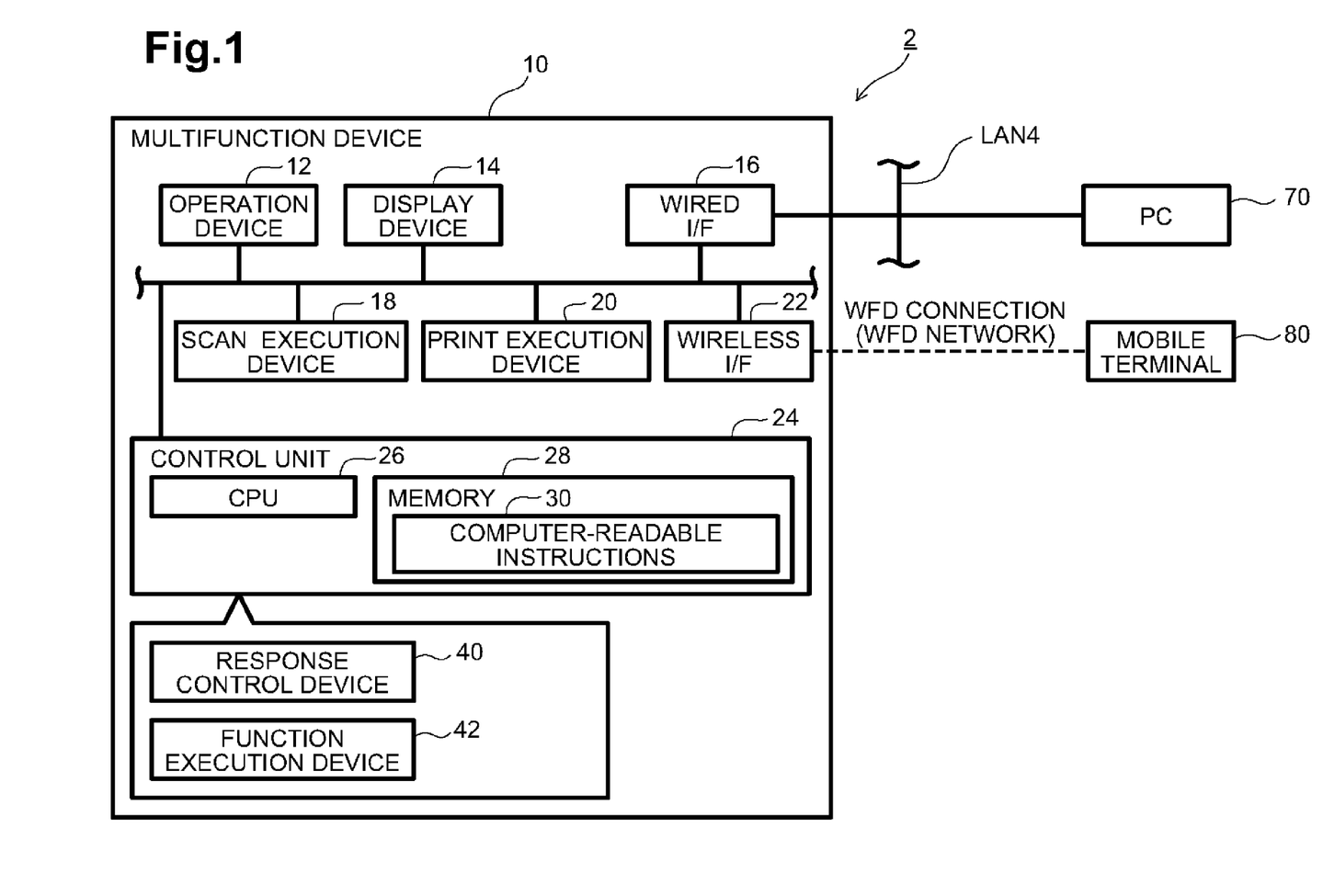
FIG. 1 is a block diagram showing particular configurations of a communication system comprising a multifunction apparatus that may operate as a communication apparatus.

Particular configurations now are disclosed. As shown in FIG. 1, the communication system 2 may comprise a multifunction device 10, a PC 70, and a mobile terminal 80. The multifunction device 10 is a peripheral device of the PC 70. The multifunction device 10 and the PC 70 may communicate with each other over a wired LAN 4.

The mobile terminal 80, which may be a portable terminal, may comprise a smartphone, a PDA, a notebook PC, or a tablet PC. The multifunction device 10 and the mobile terminal 80 may implement a wireless communication function complying with the Wi-Fi Direct™ ("WFD") standard (Wi-Fi Direct™ is a certification mark owned by the Wi-Fi Alliance of Austin, Tex.). A connection complying with the WFD standard may be referred to as a "WFD connection." The WFD standard is described in "Wi-Fi Peer-to-Peer (P2P) Technical Specification Version 1.1" created by the Wi-Fi Alliance. The multifunction device 10 may establish a WFD connection with the mobile terminal 80, thereby establishing a wireless network that complies with the WFD standard ("WFD network"). Consequently, the multifunction device 10 and the mobile terminal 80 may communicate with each other over the WFD network. Although particular configurations may be premised on the establishment of the WFD connection between the multifunction device 10 and the mobile terminal 80, a normal wireless communication function (e.g., wireless communication that complies with the 802.11 standard defined by the institute of Electrical and Electronics Engineers ("IEEE")) may be established between the multifunction device 10 and the mobile terminal 80 in some configurations.

In particular configurations, the multifunction device 10 and the PC 70 may be related to a same enterprise. Accordingly, a LAN 4 comprising the multifunction device 10 and the PC 70 may be established within an enterprise. When the PC 70 is instructed via an operation device thereof (e.g., by an agent of the enterprise) to initiate function of a plurality of functions (e.g., a Port 9100 print function) executable by the multifunction device 10, the PC 70 may transmit a request packet to the multifunction device 10 over the LAN 4.

The mobile terminal 80 may be used (e.g., by an agent temporarily visiting a particular location) to, for example, temporarily establish a WFD connection between the mobile terminal 80 and the multifunction device 10. Accordingly, the mobile terminal 80 may be used to temporarily establish a WFD network comprising the mobile terminal 80 and the multifunction device 10. Thus, when an operation device of the mobile terminal 80 is operated to instruct execution of one of a plurality of functions (e.g., a Port 9100 print function) executable by the multifunction device 10, the mobile terminal 80 may transmit a request packet to the multifunction device 10 over the WFD network.

In particular configurations, the LAN 4 may be an enduring network (e.g., a network established for long-term use), and the WFD network may be a temporary network (e.g., a network established for a short time for temporary use).

The multifunction device 10 may execute multiple functions, such as, for example, a Port 9100 print function, a Netbios print function, a network scan function, a Web server function, and an internet fax ("IFAX") function. Such functions are described later.

The multifunction device 10 may comprise an operation device 12, a display device 14, a wired interface 16 ("wired I/F"), a scan execution device 18, a print execution device 20, a wireless interface 22 ("wireless I/F"), and a control device 24. Each of devices 12, 14, 16, 18, 20, 22, and 24 may be connected to a bus line (reference numeral omitted).

The operation device 12 may comprise a plurality of keys. The operation device 12 may be operated to provide various instructions to the multifunction device 10. The display device 14 may display various kinds of information. The wired interface 16 may be connected to the wired LAN 4. The scan execution device 18 may comprise a scan mechanism, such as a contact image scanner ("CIS") or a charge-coupled device ("CCD"), and may scan a scan target to generate image data. The print execution device 20 may comprise a print mechanism of an ink jet type, a laser type, or another type and may execute printing according to an instruction from the control device 24. The wireless interface 22 may be used when the control device 24 carries out wireless communication. The control device 24 may execute a wireless communication function using the wireless interface 22.

The control device 24 may comprise a central processing unit ("CPU") 26 and a memory 28. The CPU 26 may execute various processes according to computer-readable instructions 30 stored in the memory 28. The memory 28 may comprise one or more of a read only memory ("ROM"), a random access memory ("RAM"), a hard disk, and other components. The memory 28 may store the computer-readable instructions 30, which may be executed by the CPU 26, and data which may be acquired or generated during execution of various processes by the CPU 26. The CPU 26 may function as a response control device 40 and a function execution device 42 while executing various processes according to the computer-readable instructions 30.

Moreover, the memory 28 may store the internet protocol ("IP") address of each device (e.g., PC 70, mobile terminal 80) that has established connection (non-WFD connection or WFD connection) with the multifunction device 10, and the memory 28 may store information indicating the interface (e.g., the wired interface 16 or the wireless interface 22), which may be used in carrying out the communication with the device. Therefore, the memory 28 may store, for example, the IP address of the PC 70 and information indicating the wired interface 16 in association with each other. The memory 28 further may store the IP address of the mobile terminal 80 and information indicating the wireless interface 22 in association with each other. Such pieces of information may be stored in the memory 28 every time a connection is established between the multifunction device 10 and each respective device (e.g., PC 70, mobile terminal 80).

Figure 2:
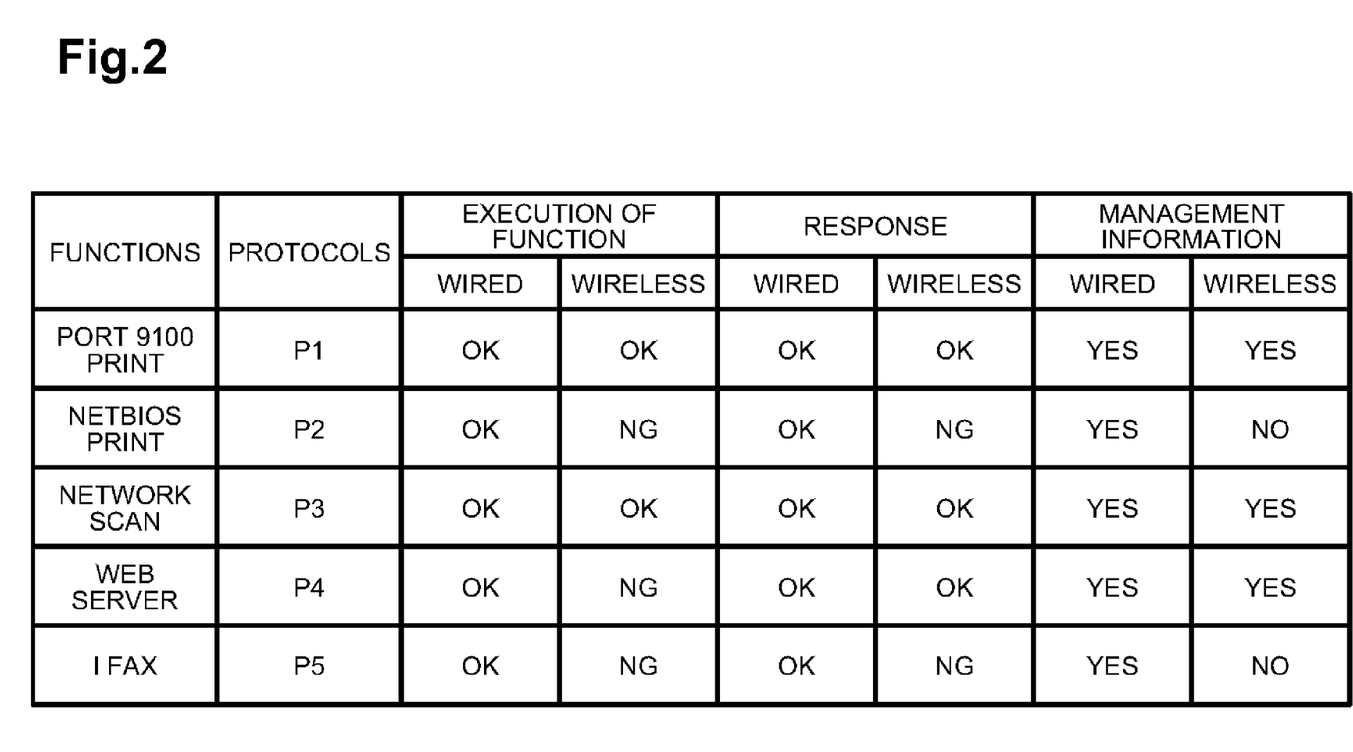
FIG. 2 is a table showing examples of operational states of a multifunction apparatus operating according to computer-readable instructions.

The table in FIG. 2 shows examples of operational states of the multifunction device 10 operating according to the computer-readable instructions 30. In the "EXECUTION OF FUNCTION" columns of FIG. 2, the characters: "OK" indicate that a function may be executed under the identified conditions, and the characters: "NC" indicate that the function may not be executed under the identified conditions. For example, the function execution device 42 may execute the Port 9100 print function when receiving a request packet complying with a protocol P1. The Port 9100 print function is an ordinary print function that is widely used. The function execution device 42 may execute the Port 9100 print function in response to receiving a request packet complying with the protocol P1 via the wired interface 16 (e.g., LAN 4), which is identified in FIG. 2 as "execution of function (wired)=OK" in the "PORT 9100 PRINT" row, and in response to receiving the request packet via the wireless interface 22 (e.g., WED network), which is identified in FIG. 2 as "execution of function (wireless)=OK" in the "PORT 9100 PRINT" row, each corresponding to the protocol P1 that may represent the Port 9100 print function herein. Hereinafter, reception of a request packet via the wired interface 16 and reception of a request packet via the wireless interface 22 may be referred to as "wired reception of a request packet" and "wireless reception of a request packet," respectively In the "RESPONSE" columns of FIG. 2, the characters: "OK" indicate that a response may be transmitted under the identified conditions, and the characters: "NG" indicate that the response may not be transmitted under the identified conditions. The response control device 40 may transmit a response packet (e.g., a normal response packet indicating execution of the Port 9100 print function) in response to wired reception of a request packet that complies with the protocol P1 and in response to wireless reception of the request packet (e.g., "response (wired)=OK" and "response (wireless)=OK," respectively, in the "PORT 9100 PRINT" row of FIG. 2). To transmit a response packet, management information for transmitting the response packet may need to be stored in the memory 28. Management information may comprise, for example, one or more of the current IP address of the multifunction device 10, the current time, the current operational state of the multifunction device 10 (e.g., printing, in standby mode, in error, or other states), and history information (e.g., date and time of reception) of previously—received request packets.

In the "MANAGEMENT INFORMATION" columns of FIG. 2, the word: "YES" indicates that a piece of management information may be stored in the memory 28 having a one-to-one correspondence with a protocol (e.g., protocols P1-P5) and an interface (e.g., wired interface 16, wireless interface 22) under the identified conditions, and the word: "NO" indicates that the piece of management information may not be stored in the memory 28 under the identified conditions. For example, first management information may be stored in the memory 28 in association with, for example, the protocol P1 and the wired interface 16 (e.g., "management information (wired)=Yes" in the "PORT 9100 PRINT" row of FIG. 2). The first management information may comprise, for example, the IP address of the multifunction device 10 that may permit the multifunction device 10 to Carry out wired communication (e.g., an IP address for wired communication). Further, the first management information may comprise history information (e.g., date and time of reception) of each previously-received request packet that was received via a wired with the protocol P1. Likewise, second management information may be stored in the memory 28 in association with, for example, the protocol P1 and the wireless interface 22 (e.g., "management information (wireless)=Yes" in the "PORT 9100 PRINT" row of FIG. 2). The second management information may comprise, for example, the IP address of the multifunction device 10 that may permit the multifunction device 10 to carry out WFD wireless communication (e.g., an IP address for wireless communication). Further, the second management information may comprise history information (e.g., date and time of reception) of each previously-received request packet that was wirelessly received via the protocol P1. Note that an IP address for wired communication and an IP address for wireless communication may differ from each other.

The Port 9100 print function is one of a plurality of major functions (e.g., a print function, a scan function, a fax function, a server function) to be executed by the multifunction device 10. Therefore, the PC 70 likely may transmit a request packet complying with the protocol P1, which corresponds to the Port 9100 print function, to the multifunction device 10 using the LAN 4, which may be established for long-term use. Further, the mobile terminal 80 may likely be operated to transmit a request packet complying with the protocol P1, which corresponds to the Port 9100 print function, to the multifunction device 10 using the WFD network, which may be established temporarily. Accordingly, the function execution device 42 may be configured to execute the Port 9100 print function in response to wired reception of a request packet and in response to wireless reception of the request packet. Because the function execution device 42 may execute the Port 9100 print function in response to wired reception of a request packet and in response to wireless reception of the request packet, the response control device 40 may transmit a response packet in response to wired reception of the request packet and in response to wireless reception of the request packer. Therefore, both pieces of management information for wired communication and pieces of management information for wireless communication (e.g., both first and second management information) may be stored in the memory 28 in association with the protocol P1.

The Netbios print function may be a print function whose printing conditions may be set in more detail than those in the Port 9100 print function. Further, the INetbios print function may, for example, correspond to the protocol P2. Thus, in response to wired reception of a request packet complying with a protocol P2, the function execution device 42 may execute the Netbios print function (e.g., "execution of function (wired)=OK" in the "NETBIOS PRINT" row of FIG. 2). The Netbios print function may not be as popular with users as the Port 9100 print function. Accordingly, it may be less likely that the mobile terminal 80 may transmit a request packet complying with the protocol P2, which corresponds to the Netbios print function, to the multifunction device 10 using the WFD network, which may be established temporarily. Further, when a request packet complying with the protocol P2 is received wirelessly, the function execution device 42 may not execute the Netbios print function (e.g., "execution of function (wireless)=ING" in the "NETBIOS PRINT" row of FIG. 2) according to particular configurations.

As described above, the function execution device 42 may execute the Netbios print function in response to wired reception of a request packet complying with a protocol P2. Accordingly, in the case of wired reception of a request packet complying with a protocol P2, the response control device 40 may transmit a response packet (e.g., "response (wired)=OK" in the "NETBIOS PRINT" row of FIG. 2). Therefore, a piece of management information may be stored in the memory 28 in association with the protocol P2 and the wired interface 16 (e.g., "management information (wired)=Yes" in the "NETBIOS PRINT" row of FIG. 2).

Nevertheless, wireless reception is rare in association with the Netbios print function, and the function execution device 42 may not execute the Netbios print function even in response to wireless reception of a request packet complying with a protocol P2. Accordingly, the response control device 40 may not transmit a response packet in response to wireless reception of a request packet complying with a protocol P2 (e.g., "response (wireless)=NG" in the "NETBIOS PRINT" row of FIG. 2). Therefore, management information also may not be stored in the memory 28 in association with the protocol P2 and the wireless interface 22 (e.g., "management information (wireless)=No" in the "NETBIOS PRINT" row of FIG. 2). Consequently, management information that may not be important may not be stored in the memory 28 according to particular configurations, and an amount of information stored in the memory 28 may be reduced. This may permit effective use of the memory 28 of the multifunction device 10.

The multifunction device 10 may perform the network scan function in response to an instruction from an external device, such as the PC 70 or the mobile terminal 80. The network scan function may be one of a plurality of major functions (e.g., print function, scan function, facsimile function, server function) to be executed by the multifunction device 10. Therefore, the function execution device 42 may execute the network scan function in response to receiving a request packet complying with a protocol P3 using wired communication as well as in response to receiving the request packet wirelessly "execution of function (wired)=OK" and "execution of function (wireless)=OK" in the "NETWORK SCAN" row of FIG. 2).

As described above, the function execution device 42 may execute the network scan function in response to wired reception and in response to wireless reception. Accordingly, the response control device 40 may transmit a response packet in response to wired reception of the request packet and in response to wireless reception of the request packet (e.g., "response (wired)=OK" and "response (wireless)=OK" in the "NETWORK SCAN" row of FIG. 2). Therefore, pieces of management information for both wired reception and wireless reception may be stored in the memory 28 in association with protocol P3 (e.g., "management information (wired) =Yes" and "management information (wireless)=Yes" in the "NETWORK SCAN" row of FIG. 2).

The Web server function may provide an external device, such as the PC 70 or the mobile terminal 80, with various kinds of information (e.g., the remaining amount of toner) about the multifunction device 10 in response to an instruction from the external device using a data format that the Web browser of the external device may interpret. The Web server function may not be a major function (e.g., print function, scan function) to be executed by the multifunction device 10, but the Web server function may be a sub-function. According to particular configurations, the function execution device 42 may execute the Web server function in response to wired reception of a request packet in order to suppress the processing load of the multifunction device 10, but the function execution device 42 may not execute the Web server function in response to wireless reception of a request packet (e.g., "execution of function (wired)=OK" and "execution of function (wireless)=NG" in the "WEB SERVER" row of FIG. 2).

As described above, the function execution device 42 may execute the Web server function in response to wired reception of a request packet. Accordingly, the response control device 40 may transmit a response packet in response to wired reception of the request packet (e.g., "response (wired)=OK" in the "WEB SERVER" row of FIG. 2). The Web server function may be a popular ordinary function, and it may be likely that the mobile terminal 80 may transmit to the multifunction device 10 a request packet complying with the protocol P4 using the WFD network. Accordingly, the response control device 40 may transmit a response packet (e.g., error packet indicating that the Web server function is not executable) in response to wireless reception (e.g., "response (wired)=OK" in the "WEB SERVER" row of FIG. 2). Such a response may serve as a notification that the multifunction device 10 is unable to execute the Web server function over the WED network. Therefore, pieces of management information corresponding to wired reception and wireless reception may be stored in the memory 28 in association with the protocol P4 (e.g., "management information (wired)=Yes" and "management information (wireless)=Yes" in the "WEB SERVER" row of FIG. 2).

The Internet FAX ("IFAX") function may cause multifunction device 10 to transmit a FAX image appended to an e-mail. The function execution device 42 may execute the IFAX function in response to receiving a request packet complying with a protocol P5 using wired communication (e.g., "execution of function (wired)=OK" in the "I FAX" row of FIG. 2). The IFAX function may not be as widely used to implement FAX communication over Public Switched Telephone Network ("PSTN") as the ordinary FAX function. Therefore, it may be less likely that the mobile terminal 80 may transmit a request packet complying with the protocol P5, which corresponds to the IFAX function, to the multifunction device 10 using the WFD network that may be established temporarily. Even when a request packet complying with the protocol P5 is received wirelessly, the function execution device 42 may not execute the IFAX function (e.g., "execution of function (wireless)=NG" in the "I FAX" row of FIG. 2).

Further, the response control device 40 may transmit a response packet in response to wired reception of a request packet, but the response control device 40 may not transmit a response packet in response to wireless reception of a request packet (e.g., "response (wired)=OK" and "response (wireless)=NG" in the "I FAX" row of FIG. 2). Therefore, although a piece of management information may be stored in the memory 28 in association with the protocol P5 and the wired interface 16 (e.g., "management information (wired)=Yes" in the "I FAX" row of FIG. 2), management information may not be stored in the memory 28 in association with the protocol P5 and the wired interface 22 (e.g., "management information (wireless)=No" in the "I FAX" row of FIG. 2). Such a configuration may be established for the IFAX function for reasons similar to those used to establish a configuration for the Netbios print function.

As described above, the multifunction device 10 may not to transmit a response packet in response to receiving a request packet complying with the protocol P2 and in response to wirelessly receiving a request packet complying with the protocol P5. Accordingly, management information may not be stored in the memory 28 in association with the protocol P2 and the wireless interface 22, and management information may not be stored in the memory 28 in association with the protocol P5 and the wireless interface 22. Consequently, the five functions shown on the table of FIG. 2, in combination, may utilize as few as eight pieces of management information stored in the memory 28. It may therefore possible to reduce the amount of information in the memory 28. This may permit effective use of the memory 28 of the multifunction device 10.

Subsequently, the contents of the processing that may be carried out by the control device 24 of the multifunction device 10 is described with reference to FIG. 3. When the multifunction device 10 is powered ON, the control device 24 may start the process shown in FIG. 3.

In Step S10, the response control device 40 of FIG. 1 may monitor reception of a request packet. Specifically, the response control device 40 may monitor for reception of a request packet from the PC 70 via the wired interface 16 in Step S10. At the same time, for example, in Step S10, the response control device 40 also may monitor for reception of a request packet from the mobile terminal 80 via the wireless interface 22.

The PC 70 may receive an instruction to execute a single function ("target function") among a plurality of functions executable by the multifunction device 10 by operating the operation device of the PC 70. Accordingly, the PC 70 may generate a request packet complying with a protocol corresponding to the target function (see FIG. 2), and the PC 70 may transmit the generated request packet to the multifunction device 10 over the LAN 4. When execution of Port 9100 printing is instructed, for example, the PC 70 may transmit a request packet, which complies with the protocol P1, to the multifunction device 10 over the LAN 4.

Figure 4:
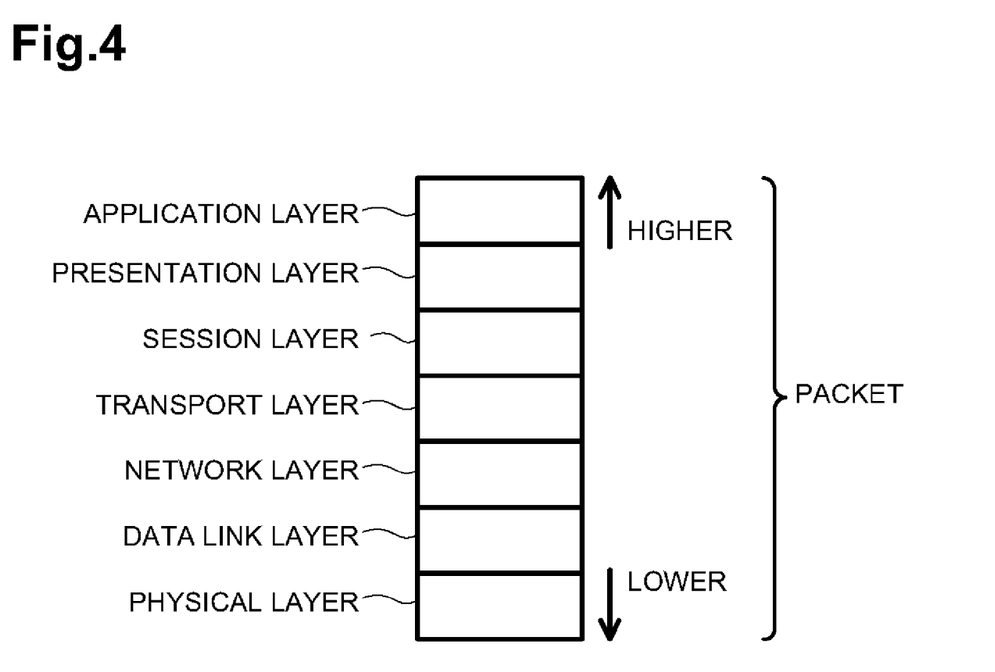
FIG. 4 is a diagram showing an example of a structure of a request packet.

The request packet that is generated by the PC 70 now is described in detail. FIG. 4 shows the structure of the request packet. The request packet may comprise a plurality of pieces of partial information corresponding to a plurality of layers of plurality of layers of the Open Systems Interconnection ("OSI") reference model created by the International Organization for Standardization ("ISO") (e.g., application layer, presentation layer, other layers shown in FIG. 4). Of the plurality of pieces of partial information, partial information corresponding to a transport layer may comprise the IP address of the PC 70, which is the sender of the request packet, and the IP address of the multifunction device 10, which is the destination of transmission of the request packet. Of the plurality of pieces of partial information, partial information corresponding to an application layer may comprise information indicative of a target function and information indicative of a protocol corresponding to the target function ("target protocol").

Likewise, the mobile terminal 80 may be used to instruct execution of a single function (e.g., target function) among a plurality of functions of the multifunction device 10 through operation of the operation device of the mobile terminal 80. Consequently, the mobile terminal 80 may transmit a request packet complying with a protocol, which corresponds to the target function (see FIG. 2), to the multifunction device 10 over the WFD network. Similarly to the PC 70, partial information corresponding to a transport layer in the request packet generated by the mobile terminal 80 may comprise the IP address of the mobile terminal 80, which is the sender of the request packet, and the IP address of the multifunction device 10, which is the destination of transmission of the request packet. Partial information corresponding to an application layer may comprise information indicative of a target function and information indicative of a target protocol.

Upon reception of the request packet transmitted from PC 70 or the mobile terminal 80, the response control device 40 may make a positive determination in Step S10 (YES in Step S10). Consequently, the response control device 40 may determine in Step S12 whether the request packet is received via the wired interface 16 or via the wireless interface 22. Specifically, in Step S12, the response control device 40 may interpret partial information corresponding to a transport layer comprised in the request packet to determine the IP address of a device that has transmitted the request packet. Subsequently, the response control device 40 may specify information in the memory 28 indicative of an interface (e.g., wired or wireless) that may be stored therein in association with the specified IP address. The response control device 40 may determine whether the interlace indicated by the specified information is the wired interface 16 or the wireless interface 22. Accordingly, the response control device 40 may interpret the partial information corresponding to the transport layer, which may be a lower layer than a session layer, to make decision in Step S12. Accordingly, the multifunction device 10 may adequately determine the interface (e.g., wired interface 16 or wireless interface 22) through which the request packet has been received.

When the multifunction device 10 determines that the request packet has been received via the wired interface 16 (YES in Step S12), the response control device 40 may proceed to Step S14. When the multifunction device 10 determines that the request packet has been received via the wireless interface 22 (NO in Step S12), the response control device 40 may proceed to Step S18.

In Step S14, the response control device 40 may transmit a response packet containing normal information ("normal response packet") via the same interface as the interface (e.g., wired or wireless) through which the request packet has been received to the request-packet sender device (e.g., PC 70 or mobile terminal 80).

Specifically, in Step S14, the response control device 40 may generate a normal response packet. In particular, the response control device 40 may specify management information (e.g., management information for wired communication corresponding to the protocol P1) in the memory 28 that is associated with the target protocol (e.g., P1) in an application layer of the request packet, and the response control device 40 may specify interface indicative information (e.g., the wired interface 16) stored in the memory 28 in association with the IP address of the sender (e.g., the IP address of the PC 70) in a transport layer of the request packet. Subsequently, the response control device 40 may generate a normal response packet using the information in the specified management information.

Partial information corresponding to a transport layer in the normal response packet may comprise the IP address of the multifunction device 10 in the specified management information as the IP address of the sender device. Further, partial information corresponding to a transport layer in the normal response packet may comprise the IP address of the device (e.g., PC 70 or mobile terminal 80) that has transmitted the normal response packet (e.g., the IP address of the request-packet sender). Furthermore, partial information corresponding to an application layer in the normal response packet may comprise information indicative of the target protocol in the request packet and the current time in the specified management information. The response control device 40 may specify the interface (e.g., wired interface 16 or wireless interface 22) stored in the memory 28 in association with the IP address of the normal-response-packet sender device (e.g., PC 70 or mobile terminal 80), and may transmit the normal response packet via the specified interface.

Upon reception of the normal response packet, the normal-response-packet sender device (e.g., PC 70 or mobile terminal 80) may display a message indicated by the normal information (e.g., "execute printing normally") on the display device of the sender device. Accordingly, the message may provide a notification that the target function is to be executed.

As described above, the response control device 40 may be configured in such a way that, in response to receiving a request packet using wired communication (YES in Step S12), the response control device 40 may transmit a normal response packet and may execute the associated function even if the request packet is complying with any one of the protocols P1 to P5 (see FIG. 2). When a request packet is received using wired communication (YES in Step S12), the response control device 40 and the function execution device 42 (see FIG. 1) skip decisions in Step S18 and Step S20 in FIG. 3

(described below) and proceed to Step S14. Upon termination of Step S14, the process may proceed to Step S16.

In Step S16, the function execution device 42 may execute the aforementioned target function. When the target function is the Port 9100 print function, for example, the function execution device 42 may permit the print execution device 20 to execute printing according to the print data in Step S16. Upon termination of Step S16, the multifunction process in FIG. 3 may be terminated.

When a negative determination is made in Step S12 (e.g., when a request packet is received wirelessly), the function execution device 42 may determine in Step S18 whether the target function is executable. Specifically, in Step S18, the function execution device 42 may interpret and utilize partial information corresponding to an application layer in the request packet to specify the target function and the target protocol. Subsequently, the function execution device 42 may determine whether the target function is executable by using the specified target protocol. Accordingly, the function execution device 42 may make a positive determination in Step S18 (YES in Step S18) when the computer-readable instructions 30 are structured to execute the target function when a request packet complying with the specified target protocol is received wirelessly. When the computer-readable instructions 30 are not structured to execute the target function when a request packet complying with the specified target protocol is received wirelessly, the function execution device 42 may make a negative determination in Step S18 (NO in Step S18). When the specified target protocol is the protocol P1 corresponding to the Port 9100 print function, for example, the function execution device 42 may make a positive determination in Step S18 (see FIG. 2). When the specified target protocol is the protocol P2 corresponding to the Netbios print function, for example, the function execution device 42 may make a negative determination in Step S18 (see FIG. 2). In this manner, the multifunction device 10 may adequately determine whether to execute the target function.

When a positive determination is made in Step S18, the process goes to Step S14. The processing in and after Step S14 may be the same as that described above. When a negative determination is made in Step S18, the function execution device 42 may not execute the target function (e.g., the function execution device 42 may not execute Step S16). Accordingly, the process may proceed to Step S20.

In Step S20, the response control device 40 may determine whether to transmit a response packet. Specifically, in Step S20, the response control device 40 may determine whether to transmit a response packet using the specified target protocol through the same procedures taken in Step S18. Accordingly, when the computer-readable instructions 30 are structured to transmit a response packet in response to wirelessly receiving a request packet complying with the specified target protocol, the response control device 40 may make a positive determination in Step 20 (YES in Step S20). When the computer-readable instructions 30 are not structured to transmit a response packet in response to wirelessly receiving a request packet complying with the specified target protocol, the response control device 40 may make a negative determination in Step 20 (NO in Step S20). When the specified target protocol is the protocol P4, for example, the response control device 40 may make a positive determination in Step 20 (sec FIG. 2). When the specified target protocol is the protocol P2, for example, the response control device 40 may make a negative determination in Step 20 (see FIG. 2). Consequently, the multifunction device 10 may adequately determine whether to transmit a response packet.

When response control device 40 makes a positive determination in Step 20 (YES in Step S20), the process may proceed to Step S22. In Step S22, the response control device 40 may transmit a response packet containing error information ("error response packet") to the mobile terminal 80 or the request-packet sender via the same interface (e.g., wireless interface 22) via which the request packet was received. Specifically, the response control device 40 may generate an error response packet in Step S22. The scheme of generating an error response packet may be substantially similar to the scheme of generating the normal response packet. Nevertheless, when generating an error response packet, the response control device 40 may generate an error response packet containing error information indicative of an error in place of normal information indicative of the normal state. According to particular configurations, error information may comprise, for example, a message "404 Not Found."

Upon reception of the error response packet, the mobile terminal 80 may display the message "404 Not Found" on the display device of the mobile terminal 80. This may provide a notification that the target function may not be executed.

When a negative determination is made in Step S20, the response control device 40 may not transmit an error response packet. Consequently, the multifunction process in FIG. 3 may be terminated.

Figure 5:
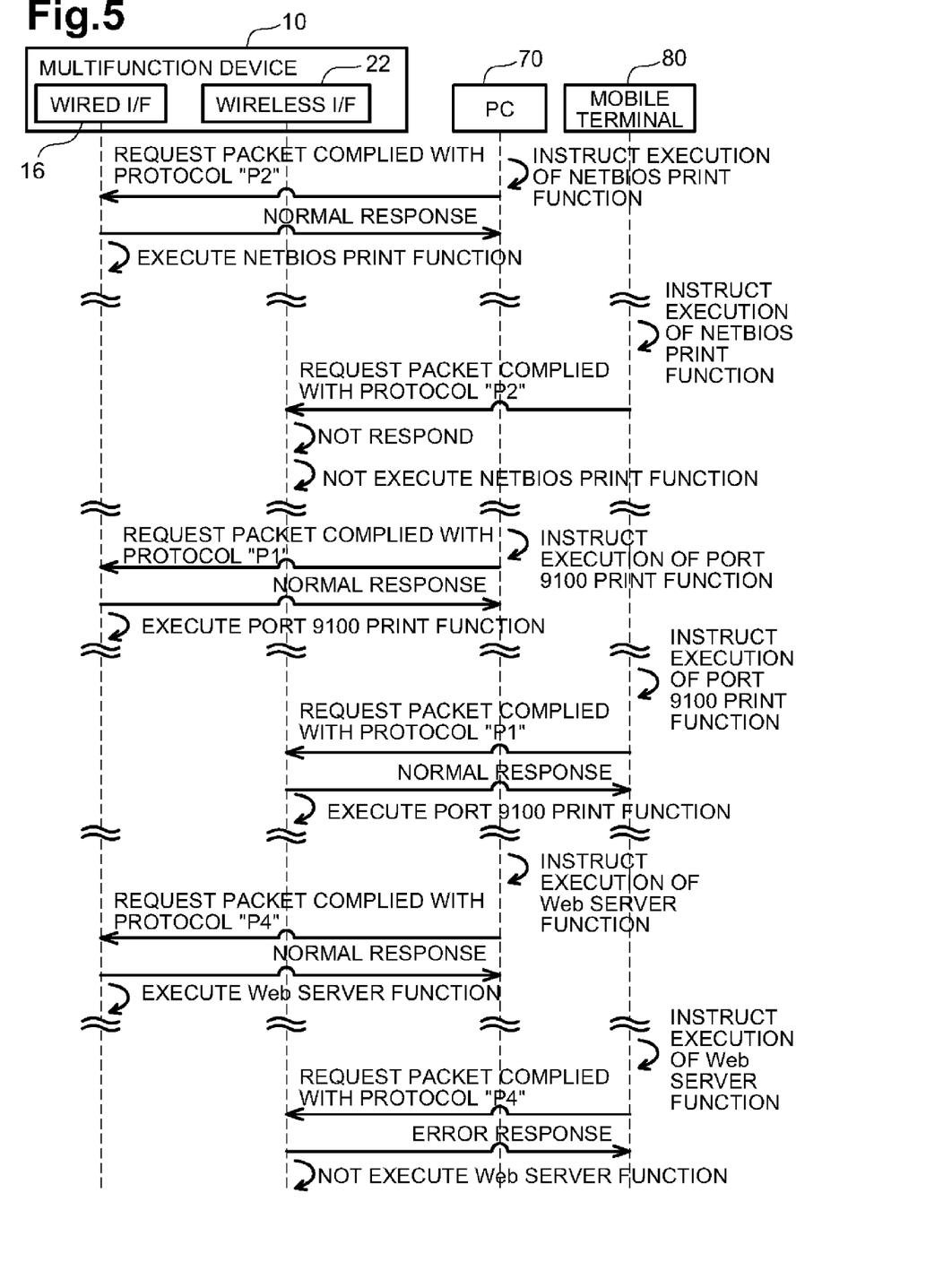
FIG. 5 is a diagram that shows a sequence of processes one or more devices in the communication system may perform.

Specific examples of the processes that the individual devices 10, 70, and 80 may execute are described with reference to FIG. 5.

The PC 70 may instruct execution of the Netbios print function in response to being operated through the operation device thereof. The PC 70 may transmit a request packet complying with the protocol P2 to the multifunction device 10 over the LAN 4. The request packet may comprise information that may request execution of the Netbios print function. The multifunction device 10 may receive the request packet complying with the protocol P2 using wired communication (YES in Step S12 in FIG. 3). When executing the computer-readable instructions 30, the multifunction device 10 may execute the Netbios print function and may transmit a response packet in response to receiving a request packet complying with the protocol P2 using wired communication (e.g., "execution of function (wired)=OK" and "response (wired)=OK" corresponding to the protocol P2 in FIG. 2). Therefore, the multifunction device 10 may transmit a normal response packet to the PC 70 via the wired interface 16 (Step S14 in FIG. 3). Subsequently, the multifunction device 10 may execute the Netbios print function (Step S16 in FIG. 3).

The mobile terminal 80 may be used to instruct execution of the Netbios print function by operating the operation device thereof. The mobile terminal 80 may transmit a request packet complying, with the protocol P2 over the WFD network. The request packet may comprise information that may request execution of the Netbios print function. The multifunction device 10 may wirelessly receive the request packet complying with the protocol P2 (NO in Step S12 in FIG. 3). When executing the computer-readable instructions 30, the multifunction device 10 may not execute the Netbios print function and transmit a response packet in response to wirelessly receiving a request packet complying with the protocol P2 (e.g., "execution of function (wireless)=NG" and "response (wired)=ING" corresponding to the protocol P2 in FIG. 2). Therefore, the multifunction device 10 may not transmit a response packet in response to the request packet to the mobile terminal 80 via the wireless interface 22. Furthermore, the multifunction device 10 may not execute the Netbios print function (NO in Step S18 and NO in Step S20 in FIG. 3). Such selective responses may relieve the processing load of the multifunction device 10. Because the multifunction device 10 may not transmit a response packet under such conditions, less management information may be stored in the memory 28. Such management information may not be stored in the memory 28, which may reduce the amount of information in the memory 28. Therefore, the memory 28 of the multifunction device 10 may be used effectively.

As shown in the foregoing example, the multifunction device 10 may switch between transmitting a response packet and not transmitting a response packet, based on whether a request packet complying with the protocol P2 is received using wired communication or wirelessly. The multifunction device 10 may also switch between executing of a Netbios print function and not executing a Netbios print function, based on whether a request packet complying with the protocol P2 is received using wired communication or wirelessly. Consequently, the multifunction device 10 may function adequately when receiving a request packet complying with the protocol P2.

The PC 70 may be used to instruct execution of the Port 9100 print function through operation of the operation device thereof. The PC 70 may transmit a request packet complying with the protocol P1 to the multifunction device 10 over the LAN 4. The multifunction device 10 may receive the request packet complying with the protocol P1 using wired communication (YES in Step S12 in FIG. 3). When executing the computer-readable instructions 30, the multifunction device 10 may execute the Port 9100 print function and transmit a response packet in response to receiving a request packet complying with the protocol P1 using wired communication (e.g., "execution of function (wired)=OK" and "response (wired)=OK" corresponding to the protocol P1 in FIG. 2). Therefore, the multifunction device 10 may transmit a normal response packet to the PC 70 via the wired interface 16 (Step S14 in FIG. 3). Subsequently, the multifunction device 10 may execute the Port 9100 print function (Step S16 in FIG. 3).

The mobile terminal 80 may be used to instruct execution of the Port 9100 print function by operating the operation device of the mobile terminal 80. The mobile terminal 80 may transmit a request packet complying with the protocol P1 over the WED network. The multifunction device 10 may wirelessly receive the request packet complying with the protocol P1 (NO in Step S12 in FIG. 3). When executing the computer-readable instructions 30, the multifunction device 10 may execute the Port 9100 print function and transmit a response packet in response to wirelessly receiving a request packet complying with the protocol P1 (e.g., "execution of function (wireless)=OK" and "response (wireless)=OK," corresponding to the protocol P1 in FIG. 2). Therefore, the multifunction device 10 may transmit a normal response packet to the mobile terminal 80 via the wireless interlace 22 (YES in Step S18 in FIG. 3, and Step S14). Subsequently, the multifunction device 10 may execute the Port 9100 print function (Step S16 in FIG. 3).

As described in the above example, the multifunction device 10 may transmit a response packet and may execute the Port 9100 print function regardless of whether a request packet complying with the protocol P1 is received using wired communication or wirelessly. Accordingly, the multifunction device 10 may function adequately when receiving a request packet complying with the protocol P1.

The PC 70 may be used to instruct execution of the Web server function through operation of the operation device thereof. The PC 70 may transmit a request packet complying with the protocol P4 over the LAN 4. The multifunction device 10 may receive the request packet complying with the protocol P4 using wired communication (YES in Step S12 in FIG. 3). When executing the computer-readable instructions 30, the multifunction device 10 may execute the Web server function and transmit a response packet in response to receiving a request packet complying with the protocol P4 using wired communication (e.g., "execution of function (wired)=OK" and "response (wired)=OK" corresponding to the protocol P4 in FIG. 2). Therefore, the multifunction device 10 may transmit a normal response packet to the PC 70 via the wired interface 16 (Step S14 in FIG. 3). Subsequently, the multifunction device 10 may execute the Web server function (Step S16 in 3).

The mobile terminal 80 may be used to instruct execution of the Web server function through operation of the operation device thereof. The mobile terminal 80 may transmit a request packet complying with the protocol P4 over the WFD network. The multifunction device 10 may wirelessly receive the request packet complying with the protocol P4 (NO in Step S12 in FIG. 3). When executing the computer-readable instructions 30, the multifunction device 10 may not execute the Web server function but may transmit a response packet in response to wirelessly receiving a request packet complying with the protocol P4 (e.g., "execution of function (wireless)=NG" and "response (wireless)=OK" corresponding to the protocol P4 in FIG. 2). Therefore, the multifunction device 10 may transmit an error response packet to the mobile terminal 80 via the wireless interface 22 (NO in Step S18 and YES in Step S20 and Step S22 in FIG. 3). The multifunction device 10 may not execute the Web server function, which may reduce the processing load thereof.

As described in the above example, the multifunction device 10 may transmit a normal response packet when receiving a request packet complying with the protocol P4 using wired communication, and the multifunction device 10 may transmit an error response packet when wirelessly receiving a request packet complying with the protocol P4. Further, the multifunction device 10 may execute the Web server function when receiving a request packet complying, with the protocol P4 using wired communication, and the multifunction device 10 may not execute the Web server function when wirelessly receiving a request packet complying with the protocol P4. Therefore, the multifunction device 10 may function adequately when receiving a request packet complying with the protocol P4.

Certain configurations are described below. In certain configurations, contents of error information contained in an error response packet, which is transmitted to the mobile terminal 80 by the response control device 40 in Step S22 in FIG. 3, may be different than that described above. According to certain configurations, error information may comprise a message: "Please use another connection method." Upon reception of an error response packet, the mobile terminal 80 may display the message: "Please use another connection method" on the display device of the mobile terminal 80. This may provide a clear notification that the target function may not be executed even though execution of the target function may have been instructed using wireless communication.

Some configurations are described below. In some configurations, contents of error information contained in an error response packet, which is transmitted to the mobile terminal 80 by the response control device 40 in Step S22 in FIG. 3, may be different than that described above. According to some configurations, error information may comprise, for example, an IP address "xxxxx," a subnet "yyyyy" and a gateway "zzzzz," each of which may be needed to establish a connection to the LAN 4, along with a message "Please use the following connection method." The above information of the IP address, the subnet, and the gateway may be included with management information associated with a target protocol and the wireless interface 22. Upon reception of an error response packet, the mobile terminal 80 may display the IP address "xxxxx," the subnet "yyyyy," and the gateway "zzzzz" for establishing connection to the LAN 4, along with the message. Accordingly, this information may allow a connection to the LAN 4 to be established using the IP address and other information displayed on the display device.

Specific examples have been described in detail above, but such examples are merely illustrative and may not restrict the scope of the appended claims. The techniques described in the appended claims comprise various modifications and changes of the foregoing specific examples. Certain modifications of the foregoing configurations are described below.

An ordinary wireless communication network (e.g., a wireless LAN) ("non-WFD network") different from the WFD network may be used in place of the LAN 4. Consequently, a single wireless interface 22 may be used for both the WFD network and the non-WFD network. Further, a first MAC address to be used for WFD connection and a second MAC address to be used for non-WFD connection may both be assigned to the wireless interface 22. Accordingly, although a single wireless interface 22 may be present physically, two wireless interfaces may exist in a software-based environment. Thus, for example, the response control device 40 may transmit a response packet in response to receiving a request packet complying with the protocol P2 over the non-WFD network and via the first wireless interface to which the first MAC address is assigned, and the response control device 40 may not transmit a response packet when receiving a request packet complying with the protocol P2 over the WFD network and via the second wireless interface to which the second MAC address is assigned. Accordingly, the wireless interface 22 to which the first MAC address is assigned, and the wireless interface 22 to which the second MAC address is assigned may be examples of the "first interface standard" and the "second interface standard," respectively. Nevertheless, such interfaces are merely examples of possible interfaces to be used in combination with the subject matter described herein.

Figure 3:
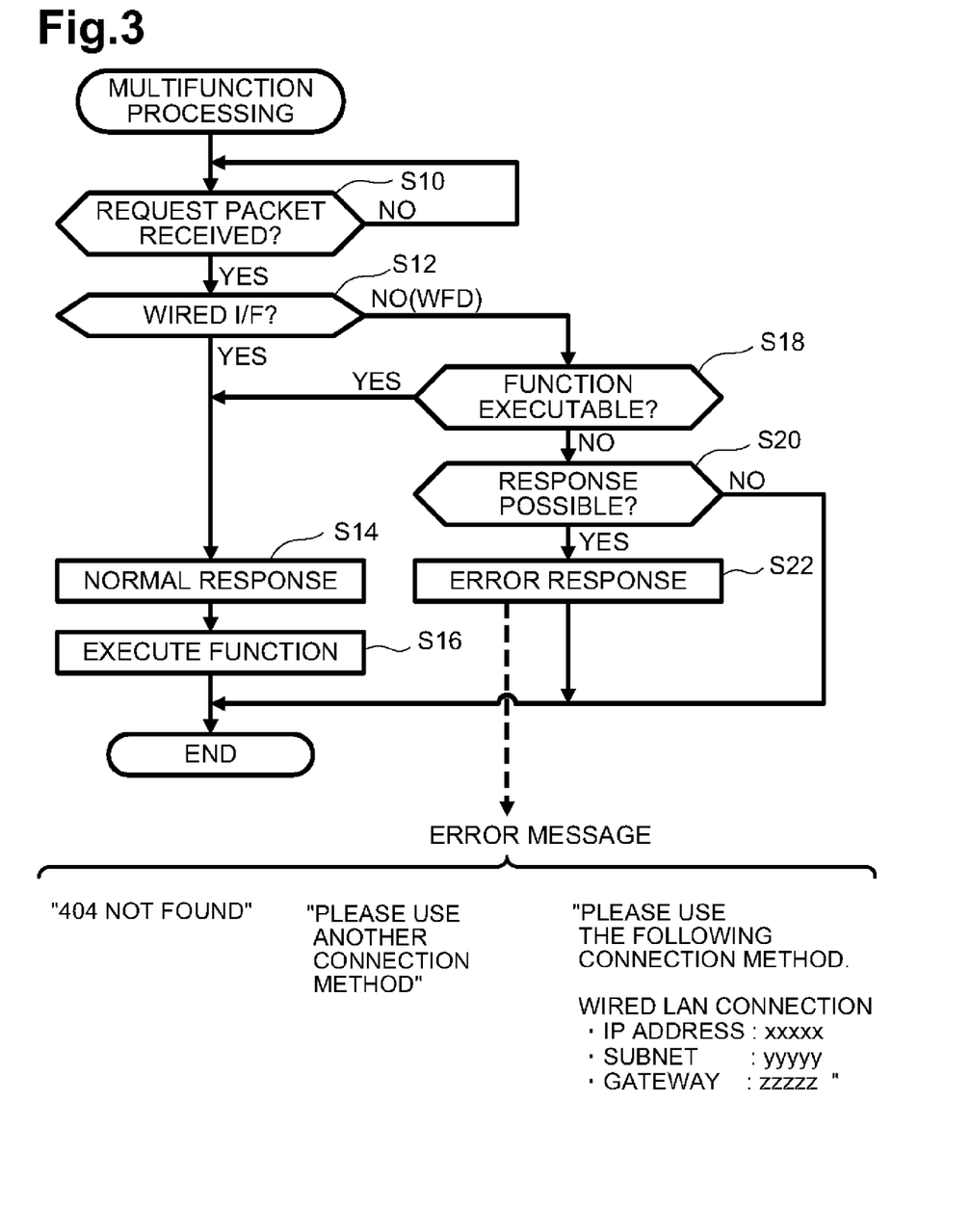
FIG. 3 is a flowchart showing a process performed by a multifunction apparatus.

According to modified configurations, when executing the computer-readable instructions 30, the multifunction device 10 may not execute the Web server function but may transmit an error response packet in response to receiving, for example, a request packet complying with the protocol P4 via the first wireless interface using the WFD network (see Step S22 in FIG. 3). According to modified configurations, however, the contents of error information contained in an error response packet to be transmitted to the mobile terminal 80 by the response control device 40 in Step S22 in FIG. 3 may differ from those of some configurations. According to modified configurations, error information may contain various kinds of information, such as the SSID of an AP to be used to establish non-WFD connection and a password, along with the message "Please use another connection method."

In Step S12 of FIG. 3, the response control device 40 may interpret partial information corresponding to a layer lower than a session layer, such as a network layer, data link layer, or physical layer, of a request packet, instead of interpreting partial information included in a transport layer of the request packet, to determine whether the request packet has been received via the wired interface 16. According to such configurations, the multifunction device 10 may adequately determine whether the request packet has been received via the wired interface 16 or via the wireless interface 22. Further, in Step S18 of FIG. 3, the function execution device 42 may interpret partial information corresponding to a session layer or a higher layer (e.g., presentation layer), instead of interpreting partial information comprised in an application layer, to determine whether the requested function is executable. According to such configurations, the multifunction device 10 may adequately determine whether the requested function will be executed. Furthermore, in Step S20 of FIG. 3, the response control device 40 may interpret partial information corresponding to a session layer or a higher layer (e.g., presentation layer), instead of interpreting partial information comprised in an application layer, to determine whether or not to transmit a response packet. According to this configuration, the multifunction device 10 may adequately determine whether to transmit a response packet.

In foregoing modified configurations, a request packet to be received from the PC 70 via the wired interface 16 may differ from a request packet to be received from the mobile terminal 80 via the wireless interface 22. The "first packet" and the "second packet" may have different contents. Consequently, in Step S12 of FIG. 3, for example, the response control device 40 may interpret partial information corresponding to a transport layer in the first request packet to determine whether the first request packet has been received via the wired interface 16, and the response control device 40 may interpret partial information corresponding to a physical layer in the second request packet to determine whether the second request packet has been received via the wired interface 16. A layer lower than the session layer in the first packet may differ from a layer lower than the session layer in the second packet. Similarly, a session layer or a higher layer in the first packet may differ from a session layer or a higher layer in the second packet.

According to configurations described above, when executing the computer-readable instructions 30, multifunction device 10 may transmit a normal response packet and may execute the associated function (see FIG. 2) in response to receiving the request packet using wired communication (YES in Step S12 in FIG. 3), regardless of the protocol used among the protocols P1 to P5. In some modified configurations, the function execution device 42 and the response control device 40 may make decisions in Step S18 and Step S20 in response to receiving the request packet using wired communication (YES in Step S12 in FIG. 3). In this case, the computer-readable instructions 30 may be structured, such that the multifunction device 10 may not execute the function and may not transmit a response packet when the target protocol for the request packet complies with a protocol among the protocols P1 to P5 (e.g., P1) (e.g., "execution of function (wired)=NG" and "execution of function (wired)=NG" corresponding to the protocol P1). Further, the computer-readable instructions 30 may be structured, such that the multifunction device 10 may not execute the function but may transmit a response packet when the target protocol for the request packet complies with a protocol among the protocols P1 to P5 (e.g., "P2") (e.g., "execution of function (wired)=NG" and "execution of function (wired)=OK" corresponding to the protocol P2).

In configurations described above, a request packet that is received by the response control device 40 using wired communication or wirelessly may be a request packet complying with a protocol among the protocols P1 to P5. Nevertheless, in modified certain configurations, the response control device 40 may receive a request packet complying with a protocol other than the protocols P1 to P5 (e.g., protocol P6). Consequently, the operational contents of the function execution device 42 and the response control device 40 may not be determined beforehand by the computer-readable instructions 30 in response to receiving a request packet complying with a protocol other than the protocols P1 to P5 (e.g., protocol P6). In response to receiving a request packet complying, with a protocol other than the protocols P1 to P5 using wired communication or wirelessly, therefore, the function execution device 42 may not execute the function and the response control device 40 may not transmit a response packet.

According to configurations described above, the response control device 40 and the function execution device 42 may be realized by the software-based execution of processes by the CPU 26 of the multifunction device 10. Instead, at least one of the response control device 40 and the function execution device 42 may be achieved by hardware such as a logic circuit or an application specific integrated circuit.

In addition, each of the technical elements which have been described herein and shown in the accompanying drawings may demonstrate one or more of the technical advantages, individually or in combination, and the combinations of the technical elements as recited in the appended claims may not be restrictive. Further, the techniques which have been described herein and shown in the accompanying drawings serve to achieve a plurality of purposes at the same time, and achievement of one of the purposes may provide one or more technical advantage.

While the invention has been described in connection with various exemplary structures and illustrative embodiments, it will be understood by those skilled in the art that other variations and modifications of the structures, configurations, and embodiments disclosed above may be made without departing from the scope of the invention. For example, this application comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. Other structures, configurations, and embodiments consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. A communication apparatus comprising:
a communication interface configured to communicate using a first interface standard and a second interface standard;
a processor; and
a memory storing computer-readable instructions therein, the computer-readable instructions, when executed by the processor, instructing the communication apparatus to:
transmit a first response packet, which complies with a specific protocol, to an external device in response to receiving a first request packet from the external device when a first condition is satisfied,
wherein the first condition is satisfied when the first request packet is received using the first interface standard and complies with the specific protocol, and
wherein the first condition is not satisfied when the first request packet is received using the second interface standard and complies with the specific protocol;

perform a specific function corresponding to the specific protocol in response to satisfaction of the first condition;
perform another function corresponding to another protocol in response to receiving a second request packet from the external device when a second condition is satisfied,
wherein the second condition is satisfied when the second request packet is received using the first interface standard and complies with the other protocol, and
wherein the second condition is satisfied when the second request packet is received using the second interface standard and complies with the other protocol;
transmit a second response packet, which comprises first execution information that indicates performance of the other function, using the first interface standard to the external device in response to receiving the second request packet using the first interface standard when the second request packet complies with the other protocol; and
transmit a third response packet, which comprises second execution information that indicates performance of the other function, using the second interface standard to the external device in response to receiving the second request packet using the second interface standard when the second request packet complies with the other protocol.

2. The communication apparatus according to claim 1, wherein the computer-readable instructions, when executed by the processor, further instruct the communication apparatus to:
exclude transmission of the first response packet, which complies with the specific protocol, to the external device when the first condition is not satisfied.

3. The communication apparatus according to claim 1, wherein the computer-readable instructions, when executed by the processor, further instruct the communication apparatus to:
exclude performance of the specific function corresponding to the specific protocol when the first condition is not satisfied.

4. The communication apparatus according to claim 1, wherein the first request packet comprises a plurality of layers in compliance with the Open Systems Interconnection ("OSI") reference model, the plurality of layers comprising:
a session layer; and
a lower layer that is lower than the session layer in the OSI reference model, and
wherein the computer-readable instructions, when executed by the processor, further instruct the communication apparatus to:
determine whether the first request packet is received using the first interface standard or the second interface standard by interpreting particular information corresponding to the lower layer.

5. The communication apparatus according to claim 1, wherein the first request packet comprises a plurality of layers in compliance with the Open Systems Interconnection ("OSI") reference model, the plurality of layers comprising:
a session layer; and
a higher layer that is higher than the session layer in the OSI reference model, and wherein the computer-readable instructions, when executed by the processor, further instruct the communication apparatus to:
  determine whether the first condition is satisfied by interpreting particular information corresponding to the higher layer.

6. The communication apparatus according to claim 1, wherein the memory is further configured to store communication information associated with transmission of the first response packet in response to satisfaction of the first condition.

7. The communication apparatus according to claim 1, wherein the communication interface comprises:
  a first hardware device configured to communicate using the first interface standard; and
  a second hardware device configured to communicate using the second interface standard.

8. A non-transitory computer-readable medium storing computer-readable instructions therein, the computer-readable instructions, when executed by a processor of a communication apparatus that communicates using a first interface standard and a second interface standard, instructing the communication apparatus to:
  transmit a response packet, which complies with a specific protocol, to an external device in response to receiving a request packet from the external device when a condition is satisfied,
    wherein the condition is satisfied when the request packet is received using the first interface standard and complies with the specific protocol, and
    wherein the condition is not satisfied when the request packet is received using the second interface standard and complies with the specific protocol;
  perform a specific function corresponding to the specific protocol in response to satisfaction of the first condition;
  perform another function corresponding to another protocol in response to receiving a second request packet from the external device when a second condition is satisfied,
    wherein the second condition is satisfied when the second request packet is received using the first interface standard and complies with the other protocol, and
    wherein the second condition is satisfied when the second request packet is received using the second interface standard and complies with the other protocol;
  transmit a second response packet, which comprises first execution information that indicates performance of the other function, using the first interface standard to the external device in response to receiving the second request packet using the first interface standard when the second request packet complies with the other protocol; and
  transmit a third response packet, which comprises second execution information that indicates performance of the other function, using the second interface standard to the external device in response to receiving the second request packet using the second interface standard when the second request packet complies with the other protocol.

9. A communication apparatus comprising:
  a communication interface configured to communicate using a first interface standard and a second interface standard;
  a processor; and
  a memory storing computer-readable instructions therein, the computer-readable instructions, when executed by the processor, instructing the communication apparatus to:
    transmit a first response packet, which complies with a specific protocol, to an external device in response to receiving a first request packet from the external device when a first condition is satisfied,
      wherein the first condition is satisfied when the first request packet is received using the first interface standard and complies with the specific protocol, and
      wherein the first condition is not satisfied when the first request packet is received using the second interface standard and complies with the specific protocol;
    perform a specific function corresponding to the specific protocol in response to satisfaction of the first condition;
    perform another function corresponding to another protocol in response to receiving a second request packet from the external device when a second condition is satisfied,
      wherein the second condition is satisfied when the second request packet is received using the first interface standard and complies with the other protocol, and
      wherein the second condition is not satisfied when the second request packet is received using the second interface standard and complies with the other protocol;
    transmit a second response packet, which comprises execution information that indicates performance of the other function, using the first interface standard to the external device in response to receiving the second request packet using the first interface standard when the second request packet complies with the other protocol; and
    transmit a third response packet, which comprises non-execution information that indicates non-performance of the other function, using the second interface standard to the external device in response to receiving the second request packet using the second interface standard when the second request packet complies with the other protocol.

10. The communication apparatus according to claim 9, wherein the computer-readable instructions, when executed by the processor, further instruct the communication apparatus to:
  exclude transmission of the first response packet, which complies with the specific protocol, to the external device when the first condition is not satisfied.

11. The communication apparatus according to claim 9, wherein the computer-readable instructions, when executed by the processor, further instruct the communication apparatus to:
  exclude performance of the specific function corresponding to the specific protocol when the first condition is not satisfied.

12. The communication apparatus according to claim 9, wherein the non-execution information comprises connection information to be used by the external device when communicating using the first interface standard.

13. The communication apparatus according to claim 9, wherein the computer-readable instructions, when executed by the processor, further instruct the communication apparatus to:
  exclude performance of the other function corresponding to the first protocol when the second condition is not satisfied.

14. The communication apparatus according to claim 9,
wherein the first request packet comprises a plurality of layers in compliance with the Open Systems Interconnection ("OSI") reference model, the plurality of layers comprising:
- a session layer; and
- a lower layer that is lower than the session layer in the OSI reference model, and wherein the computer-readable instructions, when executed by the processor, further instruct the communication apparatus to:
- determine whether the first request packet is received using the first interface standard or the second interface standard by interpreting particular information corresponding to the lower layer.

15. The communication apparatus according to claim 9, wherein the first request packet comprises a plurality of layers in compliance with the Open Systems Interconnection ("OSI") reference model, the plurality of layers comprising:
- a session layer; and
- a higher layer that is higher than the session layer in the OSI reference model, and wherein the computer-readable instructions, when executed by the processor, further instruct the communication apparatus to:
- determine whether the first condition is satisfied by interpreting particular information corresponding to the higher layer.

16. The communication apparatus according to claim 9,
wherein the memory is further configured to store communication information associated with transmission of the first response packet in response to satisfaction of the first condition.

17. The communication apparatus according to claim 9, wherein the communication interface comprises:
- a first hardware device configured to communicate using the first interface standard; and
- a second hardware device configured to communicate using the second interface standard.

* * * * *